United States Patent
Emoto et al.

(10) Patent No.: US 8,334,009 B2
(45) Date of Patent: Dec. 18, 2012

(54) ELECTRODE PRODUCING METHOD AND ELECTRODE PRODUCING APPARATUS

(75) Inventors: Kazutoshi Emoto, Tokyo (JP); Katsuo Naoi, Tokyo (JP); Kiyonori Hinoki, Tokyo (JP); Masahiro Saegusa, Tokyo (JP); Masayoshi Hirano, Tokyo (JP)

(73) Assignee: TDK Corporation, Tokyo (JP)

( * ) Notice: Subject to any disclaimer, the term of this patent is extended or adjusted under 35 U.S.C. 154(b) by 617 days.

(21) Appl. No.: 12/560,856

(22) Filed: Sep. 16, 2009

(65) Prior Publication Data

US 2010/0075022 A1    Mar. 25, 2010

(30) Foreign Application Priority Data

Sep. 24, 2008   (JP) ................................ 2008-244637

(51) Int. Cl.
*H01M 4/02* (2006.01)
*H01M 4/04* (2006.01)
*H01M 4/00* (2006.01)

(52) U.S. Cl. ...... 427/126.3; 427/58; 427/79; 427/126.1; 429/209; 429/233; 429/241; 429/242; 429/243; 118/400; 118/407; 118/410; 118/419; 118/424

(58) Field of Classification Search ........................ None
See application file for complete search history.

(56) References Cited

U.S. PATENT DOCUMENTS 6,096,455 A * 8/2000 Satake et al. .................. 429/241

FOREIGN PATENT DOCUMENTS

| JP | A-11-111272 | | 4/1999 |
| JP | 2002246032 A | * | 8/2002 |
| JP | 2004103462 A | * | 4/2004 |

* cited by examiner

*Primary Examiner* — Nathan Empie
*Assistant Examiner* — Lisha Jiang
(74) *Attorney, Agent, or Firm* — Oliff & Berridge, PLC

(57) ABSTRACT

An electrode producing method by an electrode producing apparatus has an inclining step of pressing a surface of a current collector sheet with projections extending outwardly from the surface, which is conveyed in a definite direction, to incline the projections in a direction opposite to the definite direction of the current collector sheet; and an applying step of applying a coating solution onto the current collector sheet, the projections of which have been inclined in the inclining step and which is conveyed in the definite direction, by a slit die. After the surface of the current collector sheet is pressed to incline the projections on the sheet surface in the opposite direction to the conveyance direction, the coating solution is applied onto the surface. Therefore, the coating solution can be uniformly applied onto the current collector sheet.

4 Claims, 6 Drawing Sheets

Fig.4
(A)
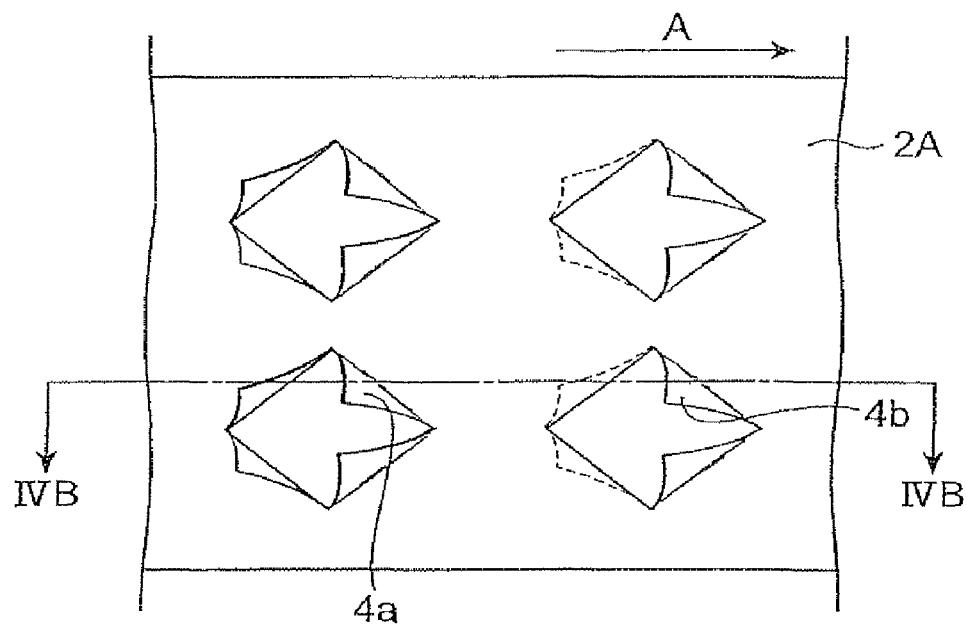
(B)
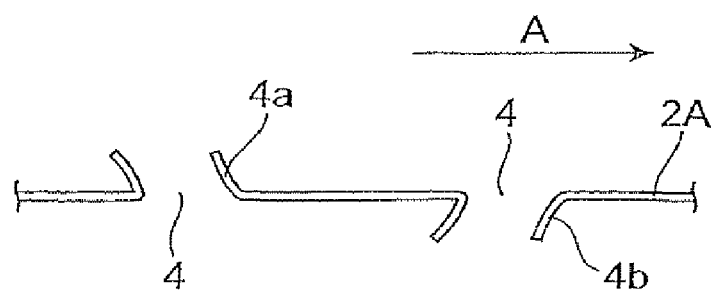
(C)
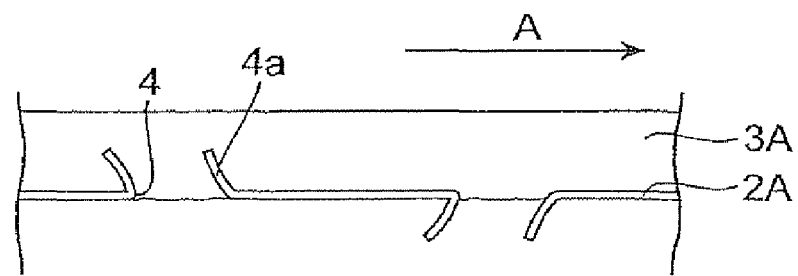

Fig.6
(A)
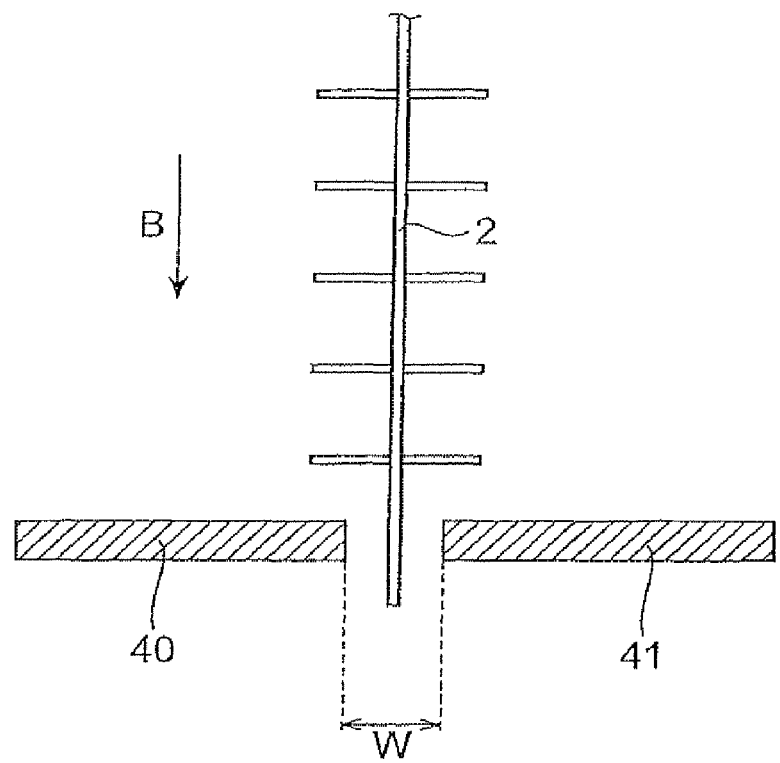
(B)
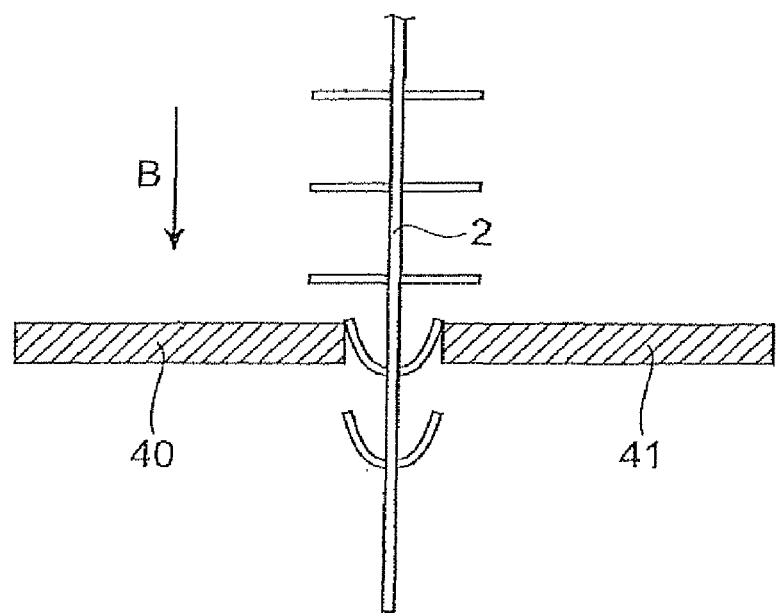

ELECTRODE PRODUCING METHOD AND ELECTRODE PRODUCING APPARATUS

BACKGROUND OF THE INVENTION

1. Field of the Invention

The present invention relates to an electrode producing method and electrode producing apparatus.

2. Related Background Art

Electrochemical devices such as primary batteries, secondary batteries (particularly, lithium-ion secondary batteries), electrolysis cells, and capacitors (particularly, electrochemical capacitors) are widely used in various fields. An electrode for such electrochemical devices is normally constructed in such a structure that an active material layer is laid on a plate-like current collector with through holes and the active material layer contains a large number of particles containing an active material, and it can be obtained normally in such a manner that a coating solution consisting of components in the active material layer on the current collector is applied onto a current collector sheet. For example, Japanese Patent Application Laid-open No. 11-111272 (Patent Literature 1) shows the electrode obtained by applying the coating solution onto the current collector with holes, drying it, and then pressing it to smooth the surface.

SUMMARY OF THE INVENTION

In recent years, in order to improve the performance of the electrode, research has been oriented toward a method of forming the active material layer while leaving burrs (projections) made during formation of through holes in the current collector, thereby improving adhesion between the current collector and the active material layer. However, when the above-described method in Patent Literature 1 is employed to apply the coating solution onto the current collector whose surface is uneven because of the projections such as burrs, it raises a problem that uniformity of coating film degrades because of the unevenness in the surface of the current collector, so as to make highly accurate coating difficult.

The present invention has been accomplished in light of the above-described circumstances and an object of the present invention is to provide an electrode producing method and electrode producing apparatus capable of uniformly depositing the coating solution on the current collector sheet with projections on the surface.

In order to achieve the above object, an electrode producing method according to the present invention is an electrode producing method comprising: an inclining step of inclining projections of a current collector sheet which has a plurality of through holes and the projections extending from edges of the through holes to the outside of the through holes and which is conveyed in a definite direction, in a direction opposite to the conveyance direction of the current collector sheet; and an applying step of applying a coating solution containing an active material onto the current collector sheet the projections of which have been inclined in the inclining step and which is conveyed in the definite direction.

An electrode producing apparatus according to the present invention is an electrode producing apparatus comprising: conveying means which conveys a current collector sheet having a plurality of through holes and projections extending from edges of the through holes to the outside of the through holes, in a definite direction; inclining means which inclines the projections of the current collector sheet conveyed in the definite direction by the conveying means, in a direction opposite to the conveyance direction of the current collector sheet; and applying means which applies a coating solution containing an active material, onto the current collector sheet the projections of which have been inclined by the inclining means and which is conveyed in the definite direction by the conveying means.

In the foregoing electrode producing method and electrode producing apparatus, the projections extending outwardly from the through holes of the current collector sheet are inclined in the direction opposite to the conveyance direction of the current collector sheet and thereafter the coating solution is applied onto the current collector sheet conveyed in the same conveyance direction. Therefore, it is feasible to suppress disturbance of coating film or the like, for example, which can be caused when the projections extending outwardly from the current collector sheet are caught during the application of the coating solution, whereby the coating solution can be uniformly deposited.

The electrode producing method is preferably configured so that the inclining step and the applying step are carried out on a single backup roll which guides the current collector sheet conveyed in the definite direction.

In this case, the current collector sheet is subjected to the inclining step of the projections and the applying step of the coating solution during a period in which the current collector sheet is guided on the single backup roll. Therefore, this configuration can reduce mixing of foreign matter or the like during conveyance of the current collector sheet and thus enables higher-accuracy coating.

The electrode producing method for effectively achieving the aforementioned action is specifically configured so that in the inclining step, the projections of the current collector sheet guided on the backup roll are pressed against the backup roll by a nip roll.

The electrode producing apparatus for effectively achieving the aforementioned action is specifically configured in a configuration further comprising a backup roll which guides the current collector sheet conveyed in the definite direction by the conveying means, wherein the applying means applies the coating solution onto the current collector sheet guided on the backup roll, and wherein the inclining means is a nip roll which presses the projections of the current collector sheet guided on the backup roll, against the backup roll, thereby inclining the projections in the direction opposite to the conveyance direction of the current collector sheet.

The electrode producing method according to the present invention may also be configured so that in the inclining step, the current collector sheet is made to pass through a space of a slit having the space smaller than a thickness of the current collector sheet including the projections and not less than a thickness of the current collector sheet excluding the projections.

The electrode producing apparatus according to the present invention may also be configured so that the inclining means is a slit having a space smaller than a thickness of the current collector sheet including the projections and larger than a thickness of the current collector sheet excluding the projections, and the slit is arranged so as to make the current collector sheet conveyed by the conveying means, pass through the space.

In this case, the current collector sheet is made to pass through the space, whereby the projections brought into contact with the slit are inclined in the direction opposite to the conveyance direction of the current collector sheet. Therefore, it is feasible to suppress occurrence of disturbance of coating film or the like, which can be caused when the projections are caught during application of the coating solution onto the current collector sheet conveyed in the definite direction, whereby the coating solution can be uniformly deposited on the current collector sheet.

The electrode producing method can also be configured so that the current collector sheet has a plurality of quadrangular through holes and the projections are provided on respective sides forming edges of the through holes so as to extend each to the outside of the through holes, and so that in the inclining step, a pair or projections extending from two adjacent sides, out of the projections provided on the respective sides of each through hole, are inclined in a direction to close the through hole and the other pair of projections extending from the sides different from the two adjacent sides are inclined in a direction to extend away from the through hole.

When the projections extending from the quadrangular through holes provided in the current collector sheet are inclined in the definite direction as described above, all the projections are uniformly inclined so as to allow highly accurate coating; therefore, the electrode can be produced with higher accuracy. Since the projections are inclined relative to the current collector sheet, the distance between the active material in the coating solution and the current collector including the projections becomes smaller than in the case where the projections extend perpendicularly to the current collector. Therefore, electrically conducting paths between the active material and the current collector sheet become shorter, so as to reduce impedance.

In the aforementioned electrode producing apparatus, a linear pressure in pressing the current collector sheet by the nip roll is preferably in the range of 2 to 50 kgf/cm. When the linear pressure is in the foregoing range, the projections of the current collector sheet can be effectively inclined.

The present invention provides the electrode producing method and electrode producing apparatus capable of uniformly depositing the coating solution on the current collector sheet with the projections on the surface.

BRIEF DESCRIPTION OF THE DRAWINGS

FIGS. 4A, 4B and 4C are drawings to illustrate a current collector sheet 2A flowing in the electrode producing apparatus 100.

FIGS. 6A and 6B are a schematic configuration diagram showing an inclining means of an electrode producing apparatus according to the second embodiment of the present invention.

DESCRIPTION OF THE PREFERRED EMBODIMENTS

The best mode for carrying out the present invention will be described below in detail with reference to the accompanying drawings. In the description of the drawings identical or similar elements will be denoted by the same reference symbols, without redundant description.

First Embodiment

Figure 1:
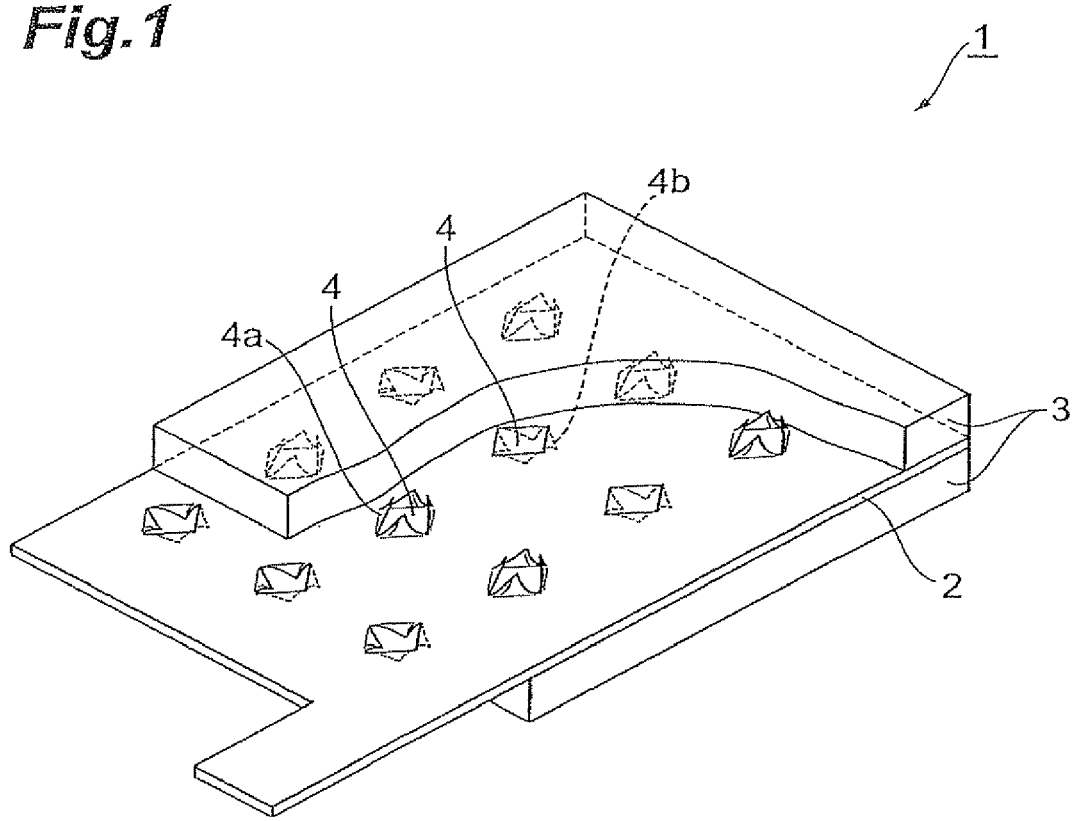
FIG. 1 is a schematic configuration diagram showing an electrode 1 according to the first embodiment of the present invention.
Figure 2:
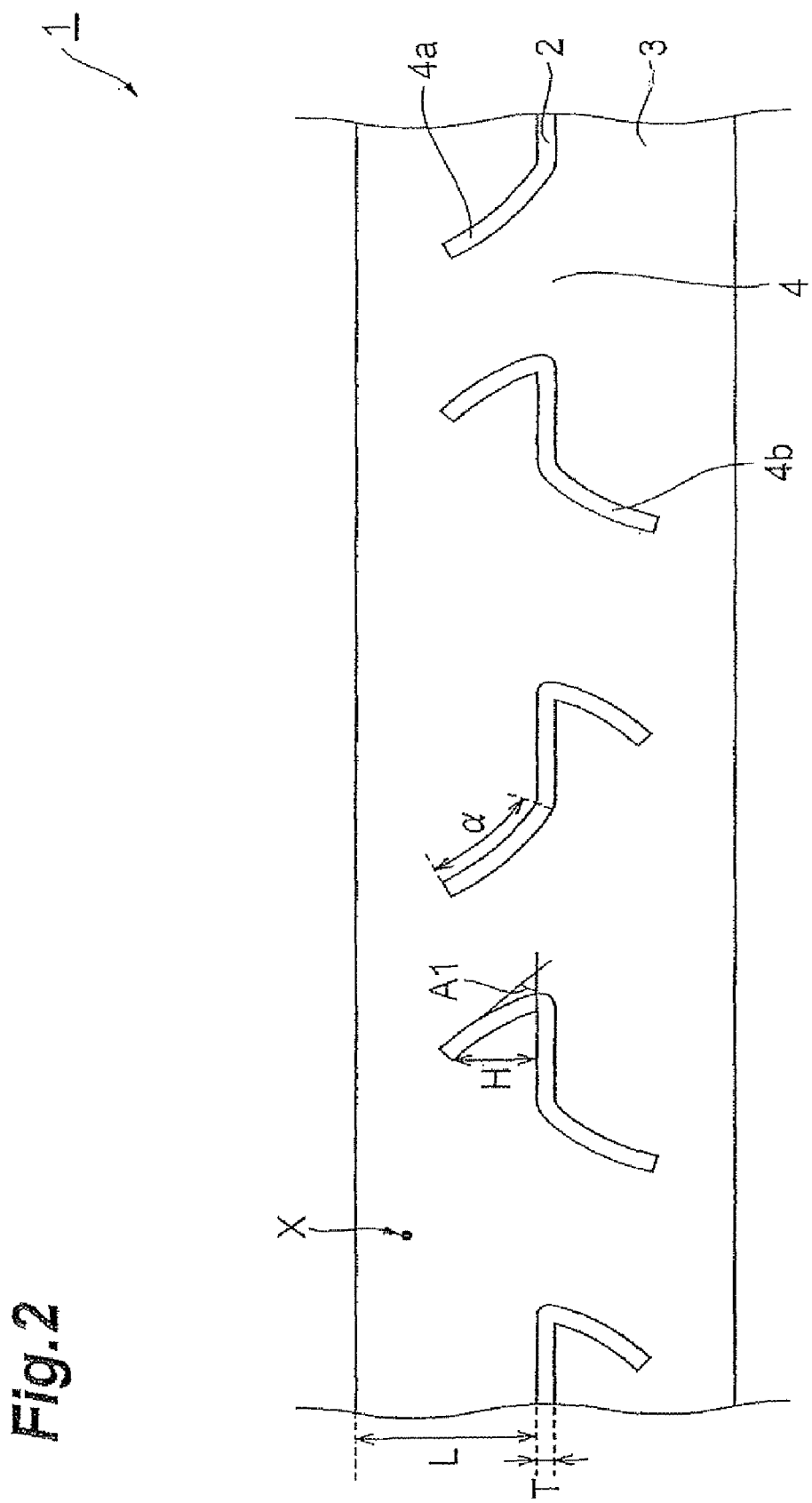
FIG. 2 is a sectional view of the electrode 1 according to the first embodiment of the present invention.

FIG. 1 is a schematic configuration diagram showing an electrode 1 produced using an electrode producing apparatus 100 according to the first embodiment of the present invention. FIG. 2 is a sectional view of the electrode 1.

The electrode 1 of the present embodiment, as shown in FIG. 1, is composed of a current collector 2, and active material layers 3 disposed on the top side and on the back side, respectively, of the current collector 2. The electrode 1 shown in FIG. 1 is suitably applicable to electrochemical devices such as primary batteries, secondary batteries (particularly, lithium-ion secondary batteries), electrolysis cells, and capacitors (particularly, electrochemical capacitors).

There are no particular restrictions on the current collector 2 as long as it is an electrically conductive sheet; for example, preferably applicable materials are copper, aluminum, and so on. There are no particular restrictions on the thickness and shape of the current collector 2, but the current collector 2 can be, for example, a belt-like sheet having the thickness (corresponding to thickness T in FIG. 2) in the range of 10 to 30 μm and the width in the range of 50 mm to 2000 min.

The active material layers 3 are formed on the top side and on the back side, respectively, of the current collector 2. The active material layers 3 are layers containing a positive-electrode or negative-electrode active material. The active material can be any one of known materials. For example, positive-electrode active materials for lithium secondary batteries are, typically, lithium oxides such as $LiCoO_2$ and $LiMn_2O_4$, and another applicable active material is one or a combination of two or more species of chalcogen compounds such as $TiS_2$, $MnO_2$, $MoO_2$, and $V_2O_5$. Negative-electrode active materials for lithium secondary batteries preferably used are lithium, lithium alloys, or carbonaceous materials such as graphite, carbon black, and acetylene black. Examples of electrodes for electric double layer capacitors include a variety of porous materials with electron conductivity. For example, preferably applicable materials include carbon materials such as natural graphite, artificial graphite, mesocarbon microbeads, mesocarbon fiber (MCF), cokes, glasslike carbon, and burned substances of organic compounds.

The active material layers 3 further contain a binder and others, in addition to the aforementioned active material. It may contain an electrical conducting agent or the like if necessary. There are no particular restrictions on the binder forming the active material layers 3, as long as it can secure the foregoing active material, electrical conducting agent, etc. to the current collector; it can be one of various binding agents. For example, applicable binders include fluorocarbon polymers such as polyvinylidene fluoride (PVDF) and polytetrafluoroethylene (PTFE), mixtures of styrene-butadiene rubber (SBR) and water-soluble polymers (carboxymethyl cellulose, polyvinyl alcohol, sodium polyacrylate, dextrin, gluten, etc.), and so on. The electrical conducting agent can be one selected, for example, from carbon blacks, metal fine powders of copper, nickel, stainless steel, iron, etc., mixtures of carbon material and metal fine powder, and electroconductive oxides such as ITO (Indium Tin Oxide).

The active material layers 3 are formed by mixing the above-described materials, for example, with a solvent such as ether or ketone, kneading or dispersing them to prepare a coating solution for formation of active material layer, applying the coating solution onto the current collector 2, and drying it. The details thereof will be described later.

The current collector 2 is provided with through holes 4 and has projections 4a extending on the top side of the current collector 2 and projections 4b extending on the back side of the current collector 2 from the edges of the through holes 4. There are no particular restrictions on a method for forming the through holes 4 and projections 4a, 4b, but the projections (4a, 4b) are formed, for example, by piercing an electroconductive sheet used as the current collector 2, to break the electroconductive sheet at hole portions (to become the through holes 4) with a tool or the like from both sides, and thereby to bend the sheet in a piercing direction of the tool. The method of forming the through holes 4 and projections 4a, 4b can be appropriately modified, for example, by altering the shape at the tip of the tool so as to facilitate formation of projections 4a, 4b on the occasion of forming the through holes 4. The current collector 2 in the present embodiment is provided with the rhombic through holes 4, but the shape of the through holes 4 may be a quadrangular shape or any other shape such as a circle. The shape of the through holes 4 can be changed by the shape of the tool or the like for formation of the through holes 4, the method of forming the through holes 4, and so on. For example, when the tip of the tool is of a quadrilateral pyramid shape, the through holes 4 are readily formed in a quadrilateral shape as shown in FIGS. 1 and 4. The current collector 2 with the through holes 4 and projections 4a, 4b preferably applicable is, for example, a punched metal sheet obtained by forming the through holes 4 in the electroconductive sheet with the tool of the shape of through holes 4 as described above, or an expanded metal sheet obtained by forming cuts in a zigzag pattern in the electroconductive sheet and expanding the cuts into a rhombic or hexagon shape.

As shown in FIG. 2, the projections 4a, 4b extend on the top side and on the back side, respectively, of the current collector 2. When the projections 4a, 4b are made by an ordinary forming method, they are formed on the occasion of forming the through holes 4 and thus the size thereof varies depending upon the size of through holes 4. The size of projections 4a, 4b also varies depending upon a situation of breakage of the electroconductive sheet with the tool, but the length a from the edge of through hole 4 is preferably in the range of 30 μm to 100 μm and particularly preferably 70 μm. When the length a of projections 4a, 4b falls within this range, the projections 4a, 4b are widely arranged in the active material layers 3. When the length a of projections 4a, 4b is in the foregoing range, the thickness L of each of the active material layers 3 formed on the top side and on the back side of the current collector 2 is preferably in the range of 50 to 200 μm. Furthermore, when H represents a distance between the tip of each projection 4a, 4b and a surface of the sheet part (main body part) of the current collector 2, a ratio (H/L) of distance H to thickness L is preferably in the range of 0.24 to 0.99. When the ratio H/L is in the foregoing range, the provision of projections 4a, 4b offers greater shortening of electrically conducting paths and reduction in impedance resulting therefrom.

An angle between each projection 4a, 4b of the current collector 2 and the sheet part (main body part) of the current collector 2 is preferably in the range of 30 to 80° and more preferably in the range of 40 to 60°. The angle between the projection 4a, 4b and the sheet part of the current collector 2 herein refers to, for example, angle A1 shown in FIG. 2. Specifically, the angle A1 is an acute angle part out of angles made between the surface part of the sheet and a tangent line to the tip part of projection 4a, at an intersection of an extension of the tangent line to the tip part of projection 4a with the surface part of the sheet of the current collector 2. When the projections 4a, 4b have an inclination in the foregoing range, instead of extending vertically to the current collector 2, as described above, a physical anchor effect is achieved, so as to provide an effect of enhancing adhesion between the current collector 2 including the projections 4a, 4b, and the active material layers 3. When the projections 4a, 4b have the inclination in the aforementioned range, the electrode further has an effect of shortening electrically conducting paths between the active material in the active material layers 3 around the projections 4a, 4b and the current collector including the projections 4a, 4b.

In the current collector 2 shown in FIGS. 1 and 2, the rhombic through holes 4 are formed and the projections 4a, 4b extend from the respective sides of the rhombic shape forming the edges of through holes 4. Some of four projections 4a, 4b extending from one through hole 4 are inclined in a direction to cover the through hole 4, while the other projections 4a, 4b are inclined in a direction to extend away from the through hole 4. As a consequence, all the projections 4a, 4b on the current collector 2 are configured so as to be inclined in the same direction (to the left in FIG. 2) and the angles between the projections 4a, 4b and the main body part of the current collector 2 fall within the aforementioned range.

There are no particular restrictions on the shape and size of through holes 4 formed in the current collector 2, either, but the through holes 4 are preferably formed in such size that the length a of projections 4a, 4b falls within the aforementioned range (30 μm to 100 μm); for example, the through holes 4 can be formed in the rhombic shape with each side of 150 μm as shown in FIG. 1. There are no particular restrictions on the number of through holes 4, either, but the through holes 4 with the projections 4a, 4b are preferably provided in the number not to significantly degrade the durability of the current collector 2, while enhancing the aforementioned effect of shortening electrically conducting paths.

Figure 5:
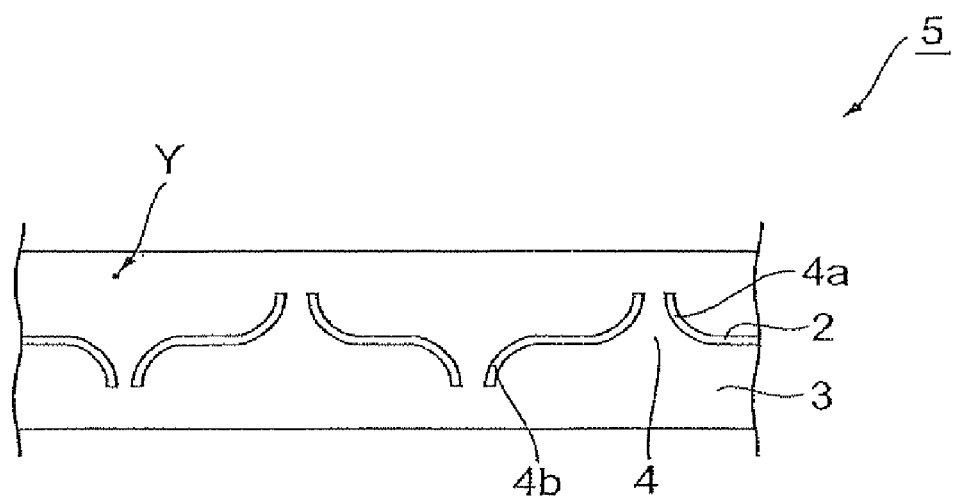
FIG. 5 is a sectional view showing a configuration of a conventional electrode 5.

The effect of shortening electrically conducting paths will be described below using FIGS. 2 and 5. FIG. 5 is a sectional view showing a configuration of a conventional electrode 5. In the conventional electrode 5, projections 4a, 4b extend each perpendicularly to the current collector 2 from the edges of through holes 4 of the current collector 2. Therefore, the active material in the active material layers 3 near the projections 4a, 4b is located near the current collector 2 and thus the electrically conducting path is short between them. However, as to a point, for example, like point Y in FIG. 5, which is located above a through hole 4 and at which the projection 4b extends in the opposite direction to the point Y (on the back side of the current collector), the point becomes farther from the projections 4a, 4b and the main body of the current collector 2 and thus the electrically conducting path becomes longer between them. Therefore, this longer electrically conducting path increases the impedance and it was infeasible to achieve sufficient reduction in impedance as a whole of electrode 5.

On the other hand, in the electrode 1 of the present embodiment, where point X is defined at a point which is located above a through hole 4 like point Y in FIG. 5, and at which the projection 4b extends in the opposite direction (on the back side of the current collector) to the point Y, the distance from the main body (sheet part) of the current collector 2 is the same as in the electrode 5 in FIG. 5, but the distance between the projection 4a and the point X becomes shorter, when compared with the point Y in FIG. 5, because the projection 4a extending on the top side of the current collector 2 is inclined toward the point X. Therefore, the electrically conducting path by the active material at point X becomes shorter than the electrically conducting path by the active material at point Y. Since the electrically conducting paths of the active material can be shortened when compared with the conventional electrode 5 as described above, the impedance can be adequately reduced as a whole of the electrode 1 and thus output characteristics can be improved thereby. In addition, the projections 4a, 4b adhere tightly to the active material layers 3, whereby high adhesion can also be maintained between the current collector 2 and the active material layers 3.

The below will describe a method of producing the above electrode 1, using FIGS. 3 and 4. Among production methods of the electrode 1, the below will detail a method (electrode producing method) of applying a coating solution 3A onto a current collector sheet 2A by means of an electrode producing apparatus 100 according to a particularly preferred embodiment of the present invention.

Figure 3:
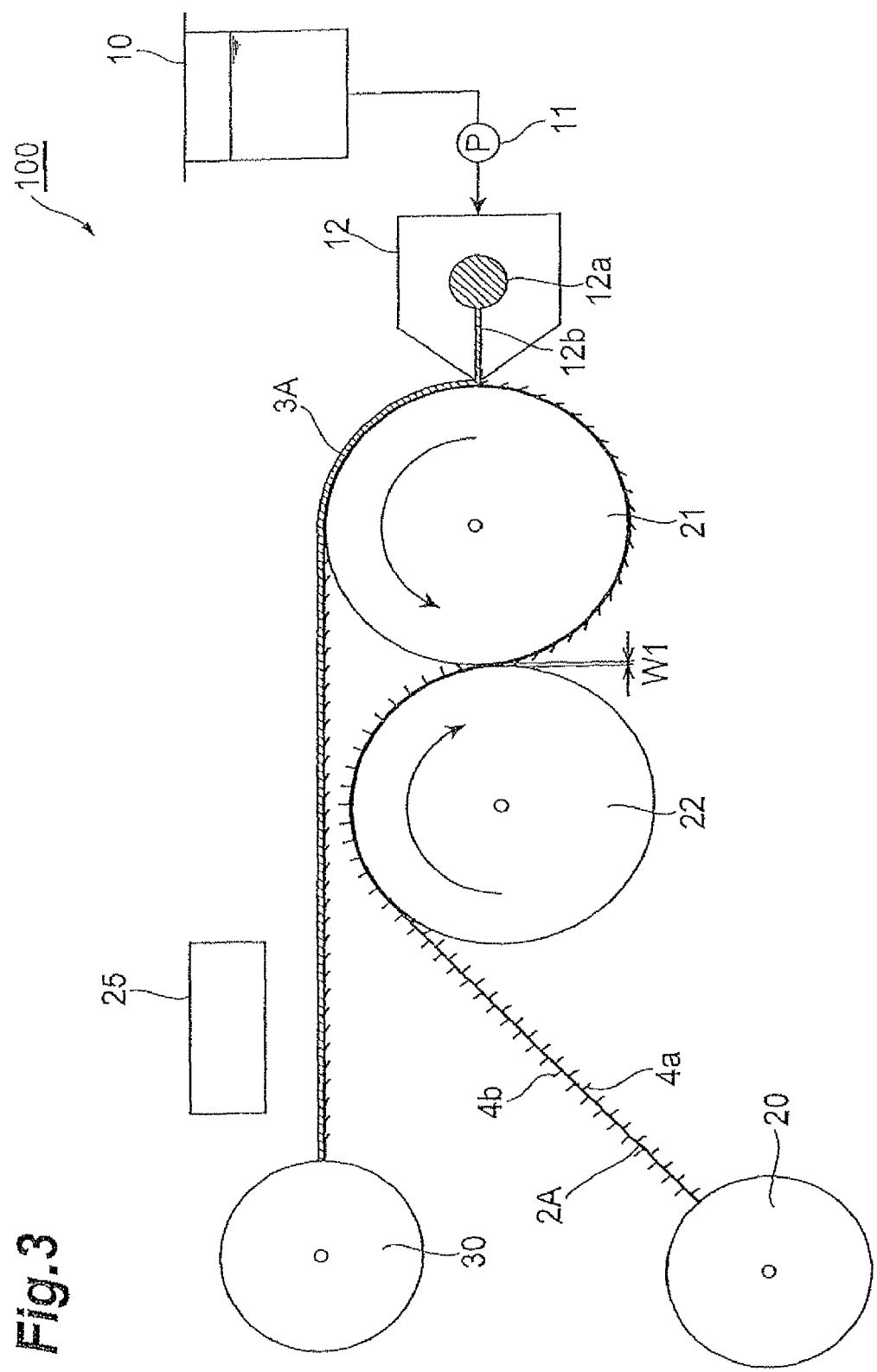
FIG. 3 is a schematic configuration diagram showing an electrode producing apparatus 100 for producing the electrode 1 according to the first embodiment of the present invention.

As shown in FIG. 3, the electrode producing apparatus 100 for producing the electrode 1 according to the present embodiment is constructed with a coating solution tank 10, a coating solution supply pump 11, a slit die 12, a sheet supply reel 20, a backup roll 21, a nip roll 22, a drier 25, and a take-up reel 30.

The coating solution tank 10 stores a coating solution for formation of active material layer. The coating solution for formation of active material layer contains the aforementioned active material, binder, electrical conducting agent, solvent, and so on. The viscosity of the coating solution is, for example, preferably in the range of 50 P to 500 P and more preferably in the range of 100 to 300 P.

A supply line L1 connects between the coating solution tank 10 and the slit die 12. The pump 11 which supplies the solution in the coating solution tank 10 to the slit die 12 at a constant rate is connected to the supply line L1. The pump 11 to be used herein can be, for example, a precision gear pump.

The sheet supply reel 20 is a reel which supplies the current collector sheet 2A, onto which the coating solution for formation of active material layer is to be applied, to the electrode producing apparatus 100. The take-up reel 30 is a reel which takes up the current collector sheet 2A having passed through the steps of being supplied from the sheet supply reel 20, being coated with the coating solution for formation of active material layer, and being dried by the drier 25 to form the active material layer. An unrepresented motor is connected to the take-up reel 30 and has a function to take up the current collector sheet 2A through rotation of the take-up reel 30 at a fixed rate. As described above, the motor and the take-up reel 30 rotated by the motor function as a conveying means of the electrode producing apparatus 100.

The projections 4a, 4b are preliminarily formed on both sides of the current collector sheet 2A used in the electrode producing apparatus 100 of the present embodiment. There are no particular restrictions on how to form the projections 4a, 4b, as described above.

The backup roll 21 is a rotatable roll of a cylindrical shape. The current collector sheet 2A which is supplied from the sheet supply reel 20 and which is taken up by the take-up reel 30 is wound around the backup roll 21. This allows the backup roll 21 to guide the current collector sheet 2A on the backup roll 21. There are no particular restrictions on the diameter of the backup roll 21, but the outside dimension thereof can be, for example, in the range of 10 to 250 mm.

There are no particular restrictions on a rotating speed of the backup roll 21, but it is preferable to set a linear velocity on the peripheral surface of the backup roll 21 so as to be equal to a line speed (take-up speed of the current collector sheet 2A by the take-up reel 30), for the purpose of preventing a sag of the current collector sheet 2A wound.

The slit die 12 has a slit 12b provided with an opening along the axial direction of the backup roll 21. This slit die 12 is configured to spread the liquid flowing thereinto from an entrance of the slit die 12, in the width direction of the current collector sheet 2A in a manifold 12a provided as a hollow space inside the slit die 12 and extending in the axial direction of the backup roll 21, and to discharge the liquid in a sheet form through the slit 12b and from the exit opening. This step is to apply the coating solution 3A onto the surface of the current collector sheet 2A (applying step). Namely, the slit die 12 functions as an applying means of the electrode producing apparatus 100. The thickness of a coating solution layer formed on the surface of the current collector sheet 2A is preferably in the range of 50 to 200 μm.

The coating solution 3A applied on the surface of the current collector sheet 2A is dried by the drier 25 provided on the way of conveyance by the take-up reel 30. The drier 25 can be a hot-wire heater, a steam heater, an infrared heater, or the like.

The nip roll 22 is disposed between the sheet supply reel 20 and the backup roll 21 and is arranged so that the axis of the nip roll 22 becomes parallel to the axis of the backup roll 21. This nip roll 22 has a function to wind the current collector sheet 2A supplied from the sheet supply reel 20, around the backup roll 21. Furthermore, it also functions as an inclining means which presses the current collector sheet 2A moving on the backup roll 21, against the peripheral surface of the backup roll 21 to incline the projections 4a, 4b on the current collector sheet 2A.

The below will detail a step of inclining the projections 4a, 4b on the current collector sheet 2A in the direction opposite to the conveyance direction by pressing by the nip roll 22 (inclining step).

When the nip roll 22 is arranged so that a distance W1 between the peripheral surface of the nip roll 22 and the peripheral surface of the backup roll 21 is smaller than the sum of the thickness of the current collector sheet 2A and the length of the projections 4a, 4b formed perpendicularly to the current collector sheet 2A (i.e., the total thickness including the main body part of the current collector and the projections 4a, 4b), the sheet is conveyed along the peripheral surfaces of the nip roll 22 and backup roll 21 while the projections 4a, 4b are pressed each against the current collector sheet 2A, whereby the projections 4a, 4b are inclined in a definite direction opposite to the conveyance direction of the current collector sheet 2A. The inclining step is carried out normally under the condition that the distance W1 is made approximately equal to the thickness of the current collector sheet 2A.

FIG. 4 is a drawing to illustrate the current collector sheet 2A flowing in the electrode producing apparatus 100. In FIG. 4, (A) and (B) are views showing the current collector sheet 2A immediately after the projections 4a, 4b are inclined by the nip roll 22 and the backup roll 21, wherein FIG. 4 (A) is a view from the top side of the current collector sheet 2A traveling in a direction indicated by arrow A (to the right in FIG. 4) and FIG. 4 (B) is a sectional view along line IVB-IVB thereof. As shown in (A) and (B) of FIG. 4, the projections 4a, 4b extending from the through holes 4 all are inclined in the direction opposite to the conveyance direction. In the case where the through holes 4 provided in the current collector sheet 2A are rhombic and where a diagonal line thereof is parallel to the conveyance direction (arrow A) of the current collector sheet 2A, as shown in FIG. 4 (A), the projections 4a, 4b provided on the edges on two adjacent sides out of the four sides forming the rhombic shape (in the case of FIG. 4 (A), the two sides on the right side being the fore side in the conveyance direction with respect to each through hole 4) are inclined in a direction to close the through hole 4. On the other hand, the projections 4a, 4b provided on the edges on the other two sides (the two sides on the left side being the back side in the conveyance direction with respect to each through hole 4) are inclined in a direction to extend away from the through hole 4. When all the sides forming the through holes 4 are present in directions different from the conveyance direction of the current collector sheet 2A as described above, the projections 4a, 4b formed on the sides become inclined without being crushed by pressing under movement in the electrode producing apparatus 100.

The linear pressure in pressing the current collector sheet 2A is preferably in the range of 2 to 50 kgf/cm and more preferably in the range of 5 to 15 kgf/cm. If the linear pressure is larger than 50 kgf/cm, the current collector sheet 2A can be damaged as the projections 4a, 4b are inclined. If the linear pressure is smaller than 2 kgf/cm, the projections 4a, 4b can fail to be adequately inclined.

In the electrode producing apparatus 100 shown in FIG. 3, the nip roll 22 presses the sheet against the peripheral surface of the backup roll 21 to incline the projections 4a, 4b of the current collector sheet 2A in the direction opposite to the conveyance direction, and then the current collector sheet 2A is continuously conveyed along the backup roll 21 to the opening of the slit die 12. The coating solution supplied from the slit die 12 is delivered onto the surface of the current collector sheet 2A (the surface on which the projections 4a are formed). FIG. 4 (C) is a sectional view of the current collector sheet 2A under supply of the coating solution 3A in an inclined state of the projections 4a, 4b. In this manner, the coating solution 3A is applied to the surroundings of the inclined projections 4a. Then the coating solution is dried to fowl the active material layer on one side of the current collector sheet 2A.

If the projections 4a on the current collector sheet 2A catch on the slit die 12, there can arise such problems as failure in application due to occurrence of positional deviation of the current collector sheet 2A and breakage of the current collector sheet 2A, as well as a problem of uneven thickness of coating film. In the case of the current collector sheet 2A of the present embodiment, however, the projections 4a are inclined in the direction opposite to the conveyance direction of the current collector sheet 2A and thus inclined in the same direction as the moving direction of the slit die 12 relative to the current collector sheet 2A. Therefore, this configuration suppresses occurrence of such an accident that the projections 4a face the slit die 12 and catch thereon at the tip; as a result, it can reduce occurrence of the various problems to be expected in the event that the projections 4a catch on the slit die 12.

After this process, the current collector sheet 2A with the active material layer on one side is arranged so that the other side becomes the surface to be coated with the coating solution 3A, in the current collector sheet 2A (in the present embodiment, so that the back side of the current collector sheet 2A is the surface to be coated). Then the nip roll 22 again presses the current collector sheet 2A to incline the projections and then the coating solution 3A is continuously applied and dried. The above results in forming the active material layers on both sides of the current collector sheet 2A. Thereafter, this sheet is cut in a predetermined size to obtain the electrode 1 according to the present embodiment.

In the electrode producing method using the electrode producing apparatus 100 according to the present embodiment, as described above, the coating solution 3A is applied onto the current collector sheet 2A conveyed in the conveyance direction, immediately after the projections 4a, 4b are inclined in the opposite direction to the conveyance direction of the current collector sheet 2A by press. Since the coating solution 3A is applied in the state in which the projections 4a, 4b are uniformly inclined in the direction opposite to the conveyance direction, the coating solution 3A can be uniformly applied accordingly. Since the inclining step is carried out immediately before the application of the coating solution 3A (applying step), it is feasible to reduce foreign matter trapped after the inclining step and thus to achieve higher-accuracy coating. This is more specifically implemented by the process of inclining the projections 4a, 4b by pressing the current collector sheet 2A moving on the peripheral surface of the backup roll 21, and thereafter applying the coating solution 3A onto the current collector sheet 2A also moving on the peripheral surface of the backup roll 21, as in the electrode producing apparatus 100 of the present embodiment.

When the electrode is produced using the electrode producing apparatus 100 of the present embodiment, it is feasible to produce the electrode 1 in which the projections are inclined in the definite direction, as shown in FIG. 2, and the impedance of which is reduced.

Furthermore, the current collector sheet 2A is subjected to the inclination of projections 4a; 4b by the nip roll 22 and the application of the coating solution by the slit die 12 during movement of the current collector sheet 2A on one roll (backup roll 21). Therefore, the inclination of projections is carried out immediately before the application of the coating solution, which can reduce mixing of foreign matter or the like during the conveyance of the current collector sheet 2A. Since the coating solution is supplied at a point of time when the current collector sheet 2A is in a thermally active state by virtue of the press by the nip roll 22, the anchor effect further enhances the adhesion between the current collector and the active material layer, when compared with the conventional case using the electroconductive sheet in a thermally inactive state. Furthermore, since the applying step is carried out immediately after completion of the inclining step during the movement on the single roll, the applying step can be carried out after the projections 4a, 4b are inclined by press by the nip roll 22 and before the inclination of the projections 4a, 4b returns because of the quality of material of the current collector sheet 2A (particularly, elastic modulus); therefore, the application of the coating solution can be performed while the projections 4a, 4b are kept adequately inclined.

In the case of the electrode producing method using the electrode producing apparatus 100, when the projections are formed so as to originate from the sides extending in the directions different from the conveyance direction of the current collector sheet 2A moving in the electrode producing apparatus 100 as shown in FIG. 4 (A), it is feasible to reduce breakage of projections due to the press on the projections, and thereby to more effectively realize reduction of impedance and improvement in adhesion.

Second Embodiment

An electrode producing apparatus according to the second embodiment of the present invention will be described below. The electrode producing apparatus of the second embodiment is provided with two plates as the inclining means and configured to let the current collector sheet pass between them to incline the projections of the current collector sheet, which is different from the inclining means in the first embodiment. The following will describe the inclining means of the electrode producing apparatus according to the second embodiment, using FIG. 6.

FIG. 6 is a schematic configuration diagram showing the inclining means of the electrode producing apparatus according to the second embodiment. As shown in FIG. 6 (A), this inclining means is a slit having a predetermined space made by two plates 40, 41. The space W of the slit made by the plates 40, 41 is set to be not less than the thickness of the main body part of the current collector sheet 2A excluding the projections 4a, 4b and to, be smaller than the total thickness of the current collector sheet 2A including the projections 4a, 4b. The slit made by the two plates 40, 41 separated by this space W is arranged so that the current collector sheet 2A conveyed by the conveying means passes through it. The conveyance direction of the current collector sheet 2A in this configuration is a direction indicated by arrow B (downward direction in FIG. 6). As a result, as shown in FIG. 6 (B), the projections 4a, 4b of the current collector sheet 2A passing between the plates 40, 41 catch on the plates 40, 41 and the catching portions thereof are inclined in the direction opposite to the conveyance direction. Thereafter, though omitted from the illustration in FIG. 6, the coating solution is applied onto the current collector sheet 2A with the projections 4a, 4b inclined in the definite direction, by the applying means (e.g., the slit die used in the first embodiment, or the like) and then is dried, thereby producing the electrode 1.

As described above, the method of inclining the projections 4a, 4b does not always have to be limited to the method using the nip roll 22 forming the electrode producing apparatus 100 shown in the first embodiment. Namely, the projections 4a, 4b can also be inclined in the direction opposite to the conveyance direction of the current collector sheet 2A by the method of letting the current collector sheet 2A pass through the slit having the space smaller than the total thickness of the current collector sheet 2A and not less than the thickness of the main body of the current collector sheet 2A. Therefore, the electrode producing method of the second embodiment also has the effect that the coating solution can be uniformly deposited on the current collector sheet 2A with the projections 4a, 4b, by the applying means, as the electrode producing method of the first embodiment does.

The slit of the inclining means in the present embodiment is made by the two plates 40, 41, but it may be made by a single plate. Namely, a significant point for the inclining means of the present embodiment is to let the current collector sheet 2A pass through a clearance having the space W smaller than the total thickness of the current collector sheet 2A including the main body of the current collector sheet and the projections, for the purpose of inclining the projections. Therefore, the slit of the inclining means can also be made by processing a single plate so as to provide it with the aforementioned space W.

The above described the preferred embodiments of the present invention, but it should be noted that the present invention is by no means limited to the above embodiments but can be modified in various ways.

For example, the electrode producing apparatus 100 according to the embodiment of the present invention was described using the slit die 12 as a device for applying the coating solution, but any other device can be used as long as it is a device capable of continuously applying the coating solution after the inclining step of the projections 4a, 4b. For example, it is possible to adopt a configuration in which the coating solution is applied by use of a mill roller, a doctor blade, or the like.

The current collector sheet 2A according to the embodiments of the present invention is provided with the inclined projections 4a, 4b on both of the top and back sides, but it is also possible to adopt a configuration wherein the projections are formed on only one side. In this configuration, the coating solution 3A containing the active material is also applied after the inclining step of the projections in the definite direction, and therefore the configuration can also enjoy the effect of performing highly accurate coating and the effect of achieving high adhesion with the active material layer 3 resulting from drying of the coating solution 3A.

Example 1

A copper current collector sheet 20 µm thick was perforated to form rhombic through holes with the length a of projections (burrs) being 70 µm in such arrangement that the rhombic through holes were alternately projecting at the pitch of 500 µm and at equal intervals from the top and back sides, thereby forming the projections on both sides of the current collector sheet. The projections of this current collector sheet were inclined using the aforementioned electrode producing apparatus 100 and the surface thereof was observed. At this time, the diameter of the nip roll 22 in the electrode producing apparatus 100 was 120 mm, the diameter of the backup roll 21 was 120 mm, and the line speed was 8 mm/min. The current collector sheet was pressed under the linear pressure of 1 kgf/cm by the nip roll 22, and the total thickness of the current collector sheet 2A after completion of the inclining process by the nip roll 22 was "T+1.8α," where T is the thickness of the main body part of the current collector sheet 2A and α is the length of projections 4a, 4b. The current collector sheet after the inclining step of the projections by the above operation was then coated with the coating solution so that the thickness of the active material layer became 70 µm. The coating solution was applied and dried to obtain the electrode of Example 1. Then the coating state was observed for the surface of the electrode of Example 1. The coating solution used in the preparation of the electrode of the present example was a solution obtained by mixing and dispersing 90 parts by mass of black lead (trade name: OMAC available from Osaka Gas Co., Ltd.) and 1 part by mass of graphite (trade name: KS-6 available from LONZA) as an active material, 2 parts by mass of carbon black (trade name: DAB available from DENKI KAGAKU KOGYO KABUSHIKI KAISHA) as an electrical conducting assistant, and 7 parts by mass of polyvinylidene fluoride (trade name: KYNAR 761 available from ATFINA) as a binding agent, thereafter adding an appropriate amount of N-methyl-pyrrolidone (NMP) as a solvent to adjust viscosity, and thereby preparing a slurry coating solution for negative electrode. The viscosity of the coating solution was 270 P.

Examples 2-11

Electrodes of Examples 2-11 were prepared by inclining the projections of the current collector sheet and then applying the coating solution by the same method as in Example 1, except that the linear pressure in the press by the nip roll 22 was changed to the conditions shown in Table 1.

Comparative Example 1

An electrode of Comparative Example 1 was prepared by applying the coating solution onto the current collector sheet without performing the press by the nip roll 22.

Table 1 shows the linear pressure in pressing the current collector sheet 2A by the nip roll 22, the thickness of the current collector sheet 2A after the inclining step of the projections by the press on the current collector sheet 2A under each linear pressure, and the observation result of the coating state of the electrode surface, in each of Examples 1-11 and Comparative Example 1.

The collector thickness after processed in Table 1 is based on T representing the thickness of the main body part of the current collector sheet and α representing the distance between the current collector sheet and the tip of projections where the projections extend perpendicularly to the current collector sheet, i.e., the length of the projections as described above. The current collector sheets used in Examples 1-5 and Comparative Example 1 are provided with the projections on both sides; for example, in the case of Comparative Example 1 where the press by the nip roll 22 is not performed and where the projections extend perpendicularly to the current collector sheet, the current collector thickness of the current collector sheet is given by "T+2α." Examples 8-11 experienced occurrence of a surge in the main body of the current collector sheet 2A at the same time as the projections were inclined by the press on the current collector sheet 2A, and thus there was little change in the current collector thickness (including the main body part and the projections) after processed.

It was confirmed by the results that the electrodes of Examples 1-11 with the projections of the current collector sheet being inclined showed no unevenness in the coating surface and thus the coating solution was uniformly applied. Furthermore, when the linear pressure was in the range of 5 to 15 kgf/cm, the projections were most preferably inclined and the application of the coating solution was carried out with higher accuracy.

TABLE 1

| | Linear pressure [kgf/cm] | Collector thickness after processed | Coating state |
|---|---|---|---|
| Comparative Example 1 | no press | T + 2α | unevenness in coating surface |
| Example 1 | 1 | T + 1.85α | partial variation in coating thickness, but little unevenness in coating surface |
| Example 2 | 2 | T + 1.8α | partial unevenness recognized at edge of collector sheet, but little unevenness in coating surface |
| Example 3 | 4 | T + 1.62α | partial unevenness recognized at edge of collector sheet, but little unevenness in coating surface |
| Example 4 | 5 | T + 1.5α | no unevenness in coating surface, and good uniformity |
| Example 5 | 10 | T + 1.2α | no unevenness in coating surface, and good uniformity |
| Example 6 | 12 | T + 0.8α | no unevenness in coating surface, and good uniformity |
| Example 7 | 15 | T + 0.5α | no unevenness in coating surface, and good uniformity |
| Example 8 | 17 | T + 0.5α | partial unevenness recognized at edge of collector sheet, but little unevenness in coating surface |
| Example 9 | 30 | T + 0.5α | partial unevenness recognized at edge of collector sheet, but little unevenness in coating surface |
| Example 10 | 50 | T + 0.5α | partial unevenness recognized at edge of collector sheet, but little unevenness in coating surface |
| Example 11 | 55 | T + 0.6α | partial crack in collector sheet, but little unevenness in coating surface |

What is claimed is:

1. An electrode producing method comprising:
   an inclining step of inclining projections of a current collector sheet which has a plurality of through holes and the projections extending from edges of the through holes to the outside of the through holes and which is conveyed in a definite direction, in a direction opposite to the conveyance direction of the current collector sheet; and
   an applying step of applying a coating solution containing an active material, onto the current collector sheet the projections of which have been inclined in the inclining step and which is conveyed in the definite direction, wherein
   the inclining step and the applying step are carried out on a single backup roll which guides the current collector sheet conveyed in the definite direction.

2. The electrode producing method according to claim 1, wherein in the inclining step, the projections of the current collector sheet guided on the backup roll are pressed against the backup roll by a nip roll.

3. The electrode producing method according to claim 1, wherein in the inclining step, the current collector sheet is made to pass through a space of a slit having the space smaller than a thickness of the current collector sheet including the projections and not less than a thickness of the current collector sheet excluding the projections.

4. The electrode producing method according to claim 1, wherein the current collector sheet has a plurality of quadrangular through holes and the projections are provided on respective sides forming edges of the through holes so as to extend each to the outside of the through holes, and
   wherein in the inclining step, a pair of projections extending from two adjacent sides, out of the projections provided on the respective sides of each through hole, are inclined in a direction to close the through hole and the other pair of projections extending from the sides different from the two adjacent sides are inclined in a direction to extend away from the through hole.

* * * * *